Sept. 24, 1929. C. S. EHRHART 1,729,374
ENDLESS TRACK ATTACHMENT FOR TRUCKS
Filed Aug. 31, 1926 3 Sheets-Sheet 1
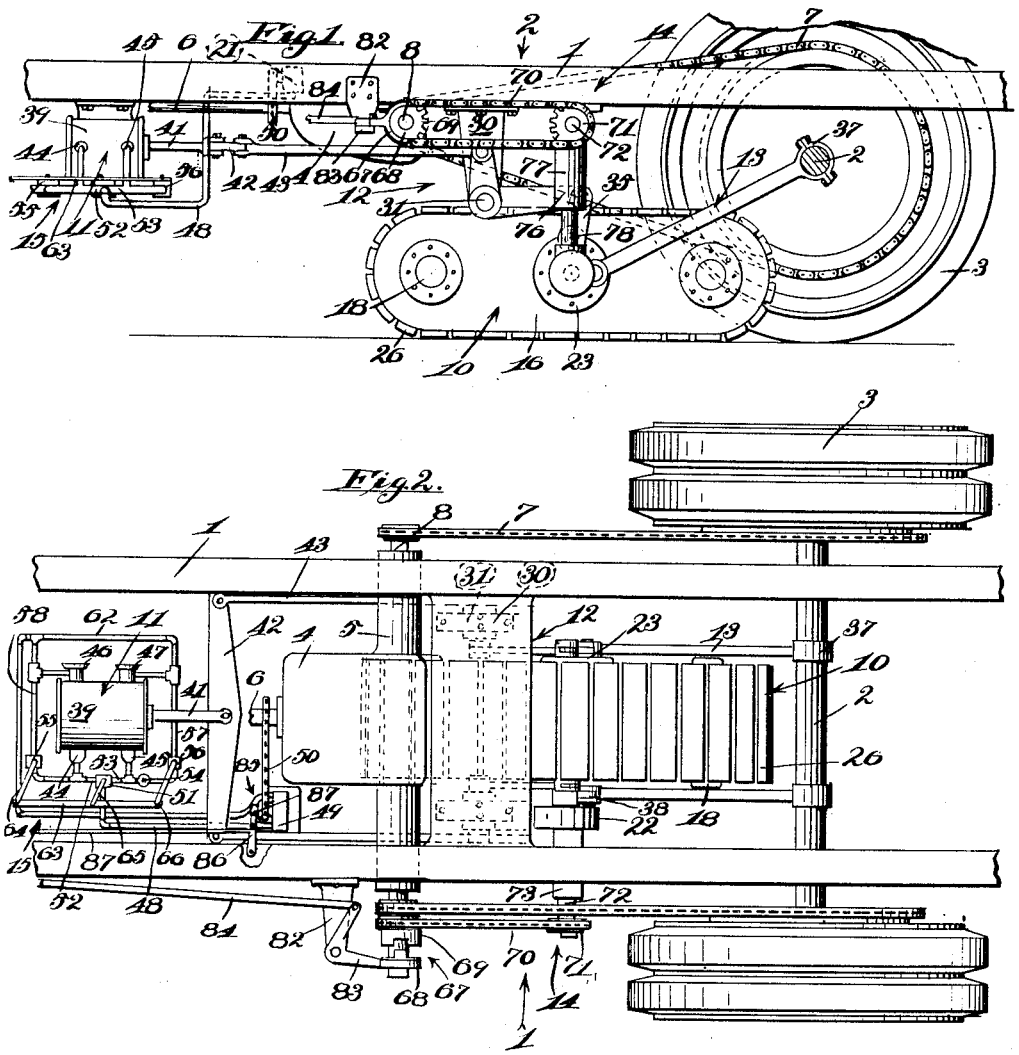
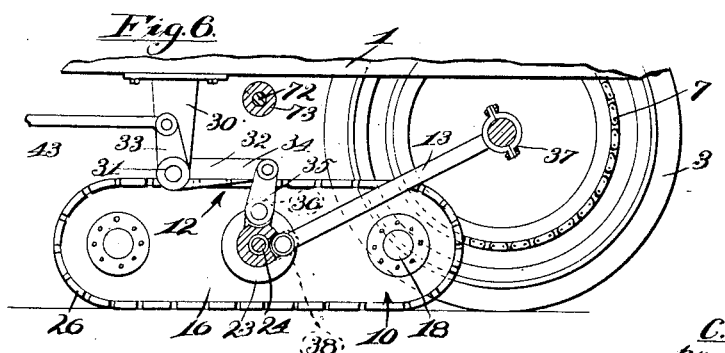

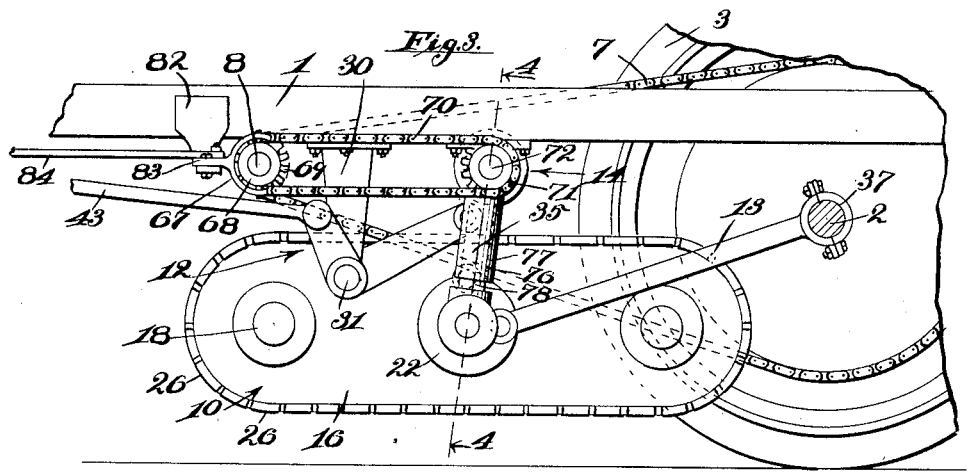
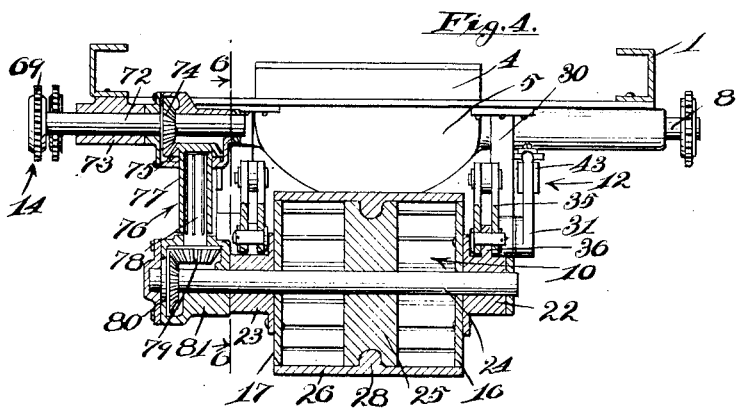
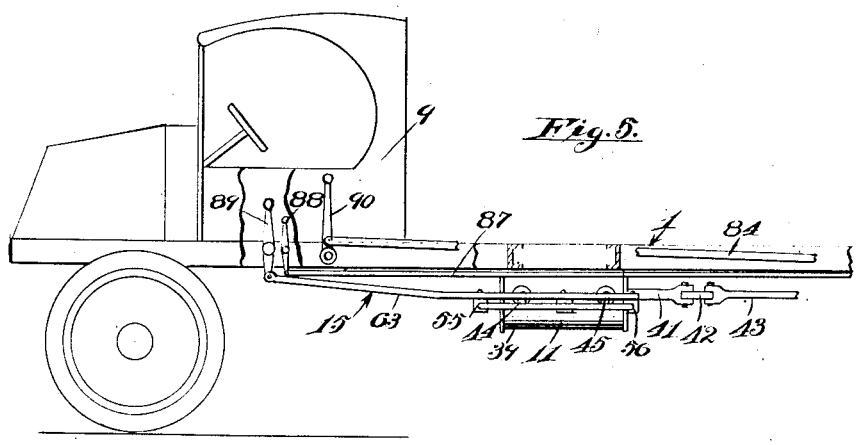

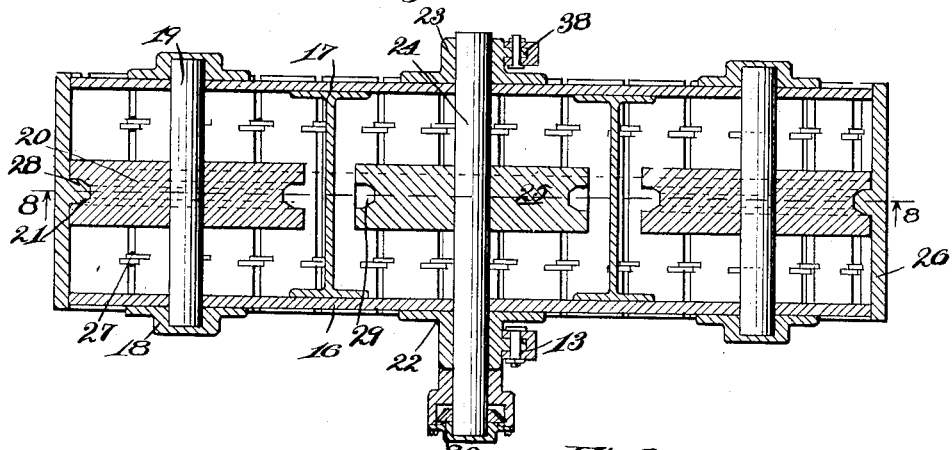
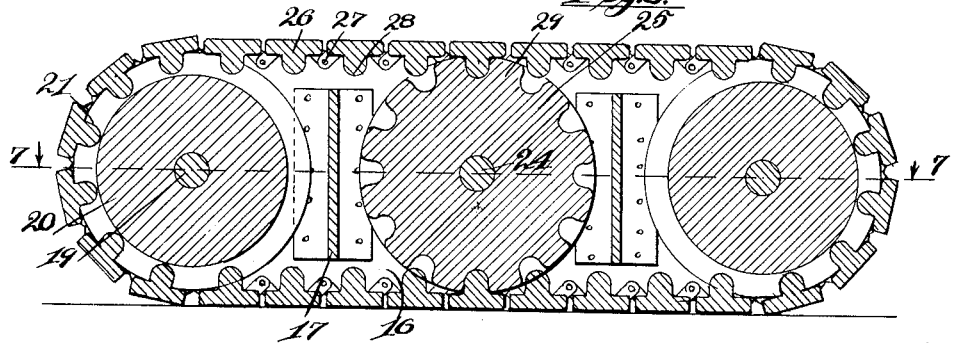
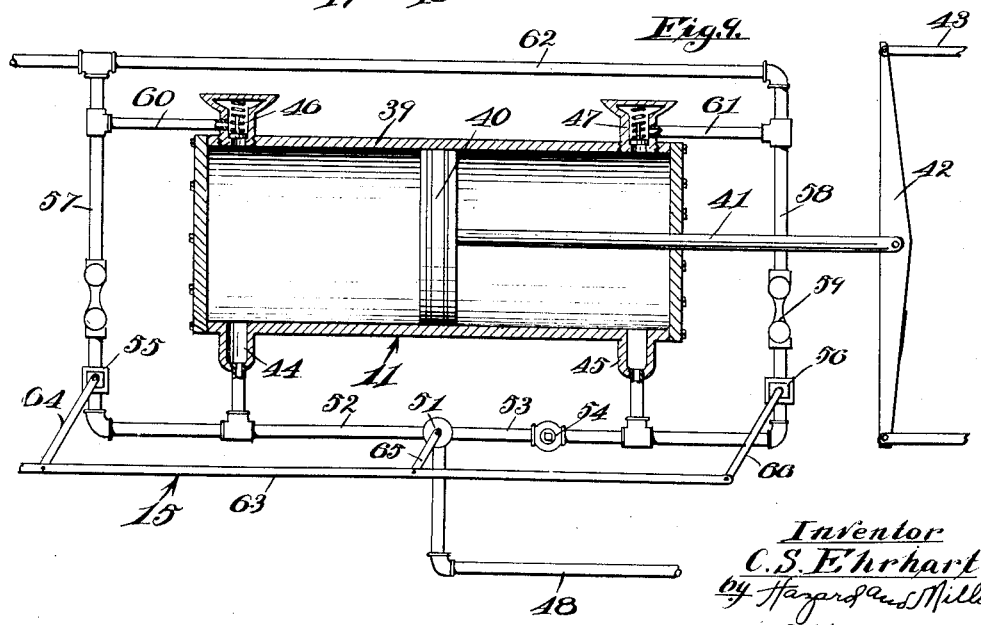

Patented Sept. 24, 1929

1,729,374

UNITED STATES PATENT OFFICE

CHARLES S. EHRHART, OF LOS ANGELES, CALIFORNIA

ENDLESS-TRACK ATTACHMENT FOR TRUCKS

Application filed August 31, 1926. Serial No. 132,697.

My invention is an endless track attachment for trucks operating as a booster to aid trucks in pulling out of places where the wheels do not have sufficient traction or where the ground is so soft that the wheels of the truck would sink to too great a depth.

An object of my invention is the construction and installation of an endless track attachment for trucks which may be installed on trucks at present on the market, as well as on new trucks, to give an endless track booster type of traction in addition to that of the truck wheels, such being of particular use when the ordinary truck wheels do not have sufficient traction or sink too deep into the ground.

Another object of my invention is in having a mechanism for lifting and depressing the endless track attachment to carry same normally at sufficient elevation above the road and to depress same against the road or ground to transfer the desired proportion of weight of the truck to the endless track booster attachment and to relieve the wheels of a certain amount of the weight of the truck.

Another object of my invention is in the construction of a center drive endless track device and the mounting of such endless track attachment so that such endless track device may follow the irregularities of the ground and still adequately carry a proportion of the weight of the truck and the desired amount of driving force.

The specific objects of my invention are in the manner of manipulating the endless track attachment and transmitting a drive for same from the power mechanism of the truck.

In constructing my invention I preferably use a hydraulic cylinder having a piston therein supplying the power for raising and lowering the endless track attachment, this latter having heavy side plates with front and rear idler axles with supporting wheels therein journaled in the side plates and a center journaled axle with a toothed driving wheel engaging a toothed endless track link tread. By a system of levers and links connected from the side plates to the hydraulic cylinder, the endless track booster is raised and lowered, there being suitable radius rods to connect same to a fixed part of a truck.

The mechanical drive may be of any suitable kind, that shown comprising a chain drive to a counter-shaft from the transmission mechanism or differential drive of the truck and by a telescopic shaft from the counter-shaft to the driving shaft and wheel of the endless track attachment.

My invention will be more readily understood from the following description and drawings, in which;

Figure 1 is a side elevation as if taken in the direction of the arrow 1 of Fig. 2, of part of a truck showing my endless track attachment in the position in engagement with the ground for operating as a booster;

Fig. 2 is a plan view of Fig. 1 taken in the direction of the arrow 2 of Fig. 1;

Fig. 3 is a view similar to Fig. 1 with the endless track booster attachment elevated in the normal position for carrying when not in use;

Fig. 4 is a vertical transverse section on the line 4—4 of Fig. 3 in the direction of the arrows;

Fig. 5 is a side elevation partly broken away, of the forward part of a truck, showing the control gear for operating the hydraulic pump, the valve rod for the hydraulic cylinder and the clutch for transmitting power to the endless track attachment;

Fig. 6 is a section on the line 6—6 of Fig. 4 in the direction of the arrows, showing the arrangement in particular, for elevating and depressing the endless track attachment;

Fig. 7 is a longitudinal section on the line 7—7 of Fig. 8, through the endless track mechanism;

Fig. 8 is a longitudinal section of Fig. 7, on the line 8—8 in the direction of the arrows;

Fig. 9 is a diagrammatic view of the hydraulic cylinder, the piping system and the various valves, showing the cylinder in longitudinal section.

The truck construction is substantially as follows, being illustrated particularly in Figs. 1, 2, 3 and 5.

The side frames of the truck are designated by the numeral 1, the rear axle 2 having the driving wheels 3, the power transmission 4 having the differential or equivalent structure in a suitable housing 5 with a drive shaft 6 from the engine, and a chain type of drive 7 to the rear wheels from the shaft 8. It is to be understood that other types of drive mechanism may be utilized.

The forward end of the truck shown in Fig. 5 has a suitable cab or driver's compartment 9 with various control devices for operating the endless track booster attachment as hereunder set forth, it being understood that the side frame rails 1 extend the length of the truck, the other portions of a standard truck not being particularly designated as they form no immediate part of this invention.

The main elements of the endless track booster attachment comprise the endless track mechanism designated generally by the numeral 10, a hydraulic cylinder construction indicated by the numeral 11, a raising and lowering mechanism designated by the numeral 12, a radius rod 13, a mechanical drive 14 from a suitable power mechanism and the general control features designated by the numeral 15, represented in Fig. 5.

The endless track mechanism numeral 10, is constructed substantially as follows, having reference particularly to Figs. 6, 7 and 8:

Two heavy side plates 16 are rigidly connected by cross beams 17 shown as I-beams. These plates have suitable journal boxes 18 with idler shafts 19 mounted therein and with idler wheels 20 on said shafts, these wheels having an annular groove 21. Main journal boxes 22 and 23 are centrally positioned on the plates 16 and have a main drive shaft 24 journaled therein, this shaft having a driving sprocket wheel 25 suitably secured thereto. The endless track treads 26 are connected together by pivot pins 27 and each link is provided with a tooth 28 engaging in the groove between the teeth 29 of the driving wheel 25. The teeth of the tread fit into the grooves 21 of the idler wheels 20.

It will be seen therefore, that when the drive shaft 24 is rotated that the driving sprocket carries the treads in the desired direction and that such treads are suitably supported on the idler wheels 20 and also by the periphery of the heavy side plates 16. The various operating parts would be oiled or greased in any suitable manner and are not illustrated herein.

The lowering and lifting mechanism for the endless track attachment including the main elements 12 and 13, is substantially as follows, having reference to Figs. 6 and 7:

A pair of suitable heavy brackets 30 are attached to the side frames of the truck or in any suitable position and carry a rock shaft 31 journaled therein. A pair of bell cranks 32 having an upwardly extending arm 33 and a rearwardly extending arm 34 are mounted on the rock shaft 31 or are loose thereon as desired. A pair of lifting links 35 pivoted to the ends of the arms 34 extend downwardly and are pivotally connected to ears 36 extending outwardly from the main journal boxes 22 and 23. The pair of radius rods 13 are clamped around the rear axle 2 by clamps 37 or the like and are pivotally connected to ears 38 also extending outwardly from the main journal boxes 22 and 23.

The hydraulic cylinder construction for operating the raising and lowering mechanism is substantially as follows, having reference particularly to Figs. 1, 2 and 9:

A cylinder 39 of proper size and strength is suitably mounted in the truck frame and has a piston 40 therein with a piston rod 41. This rod is connected to a balanced lever 42 which connects to a pair of links 43 pivotally connected to the upper arm 33 of the bell cranks 32. The cylinder is provided with inlets 44 and 45 at each end and with pressure relief valves 46 and 47 also at each end, and with a system of control piping and valves substantially as follows, shown particularly in Fig. 9:

A pressure hydraulic pipe 48 is connected to a suitable hydraulic pump 49, this being operated by any suitable drive such as a belt drive 50 from the engine drive shaft 6 (see Fig. 2). The pipe 48 leads to a 3-way valve 51 and to opposite lead pipes 52 and 53, these being connected to the inlets 44 and 45, the pipe 53 having a check valve 54 therein.

Valves 55 and 56 lead to cross pipes 57 and 58, each of these having a pressure reducer 59 installed therein. Relief pipes 60 and 61 are connected to the relief valves 46 and 47 and with the cross pipes 57 and 58, and are connected to the return pipe 62 which leads to a suitable oil reservoir or the like which would be connected to the pump or to the pump truck. A control rod 63 having arms 64, 65 and 66 connected to the valves 55, 51 and 56 respectively, control the flow of hydraulic fluid as set forth hereunder in connection with the chain control features designated generally by the numeral 15.

The mechanical power drive from the truck power mechanism to the endless track attachment designated generally by the numeral 14 is substantially as follows, having reference particularly to Figs. 1, 2, 3 and 4:

The drive shaft 8 for transmitting driving power from the differential mechanism or transmission to the rear wheels of the truck is provided with a clutch on one end indicated by the numeral 67, having a rotating element 68 keyed on the shaft and a cooperative element with a sprocket gear 69 loosely on the shaft. A sprocket chain 70 leads to a sprocket wheel 71 mounted on the countershaft 72, this having a suitable journal 73 attached to the side frame or other suitable part of the truck frame. A bevel gear 74 meshes with a suitable bevel pinion 75 on the telescopic vertical shaft 76, this shaft having a downwardly extending sleeve 77 connected to the pinion 75 and a solid lower shaft 78 splined or otherwise connected with the sleeve. This lower shaft has a bevel gear 79 meshing with a bevel gear 80 on the main drive shaft 24, there being a suitable journal box 81 fitted on one end of the shaft 24 and housing the gears 79 and 80 and suitable lubricating mechanism.

A clutch bracket 82 extending laterally from the truck frame has a pivotally mounted bell crank 83 mounted thereon, one arm of which connects to the rotatable and slidable clutch element 68 and the other end being connected to a clutch rod 84.

The general control features designated by the numeral 15 are substantially as follows, having reference particularly to Figs. 1, 2 and 5.

As above mentioned the pump 49 is operated by a drive belt 50 or the like from the main propeller shaft 6 of the truck and has a suitable clutch mechanism 85 to connect and disconnect said drive and the pump, this having a pivoted lever 86 suitably connected to the frame and a pump clutch rod 87, the latter being connected to a pump control lever 88 in the cab 9. The valve rod 63 controlling the valves of the hydraulic cylinder 37 leads to a valve control lever 89 also in the cab and a link 84 operating the power clutch 67 leads to a power clutch lever 90 in the cab. The pipes 48 and 62 are shown as being connected to the pump 49.

The mechanism for operating the raising and lowering mechanism for the endless track attachment, operates substantially as follows:

It is preferable that the truck be at rest before the endless track attachment is lowered, this being generally carried in an elevated position as shown in Fig. 3 and in the elevated position the piston would be at the left hand end of the cylinder and the hydraulic pressure on the piston rod side is maintained therein by the check valve 54 and the pressure relief valve 47. When it is desired to lower the endless track mechanism the pump control lever from the cab is operated to connect the clutch of the pump to drive same and the valve control lever is operated to open the connection through the pipe 48, the valve 51, the pipe 52 to the intake 44. In the illustrations of Fig. 9 these are shown as being closed, the valve 51 is shown as being open leading to the pipe 53, the valve 56 being closed and the valve 55 being open.

As hydraulic pressure is exerted on the piston 40, it moves the piston rod 51, thrusting the balance lever outwardly and transmitting power to the bell crank 31, depressing the endless track device by the links 35. The radius rods 13 maintain the endless track attachment at the proper distance from the rear axle structure and function in transmitting a driving force.

In order to relieve the driving wheels of the truck of the weight of the truck and the load, the pump is continuously driven, always exerting a force on the piston 40, the pressure being maintained in accordance with the setting of the relief valve 46. This valve is preferably designed as a readily adjustable valve so that the pressure may be changed as it is desirable to increase or decrease the proportion of weight supported by the endless track structure and the driving wheels of the truck. With my construction it is not desired that the driving wheels be elevated above the ground, or have no traction, but that they also be utilized with the endless track to pull the truck out of difficult places.

After the load is suitably supported on the endless track attachment the power clutch lever in the cab is operated to actuate the clutch 67 and transmit power from the drive shaft 8 to the endless track drive shaft 24 and move the endless track tread in the direction desired. It will be noted that my attachment may drive the truck either forward or rearwardly in accordance with the direction of rotation of the shaft 8. On account of the weight of the endless track attachment it is hardly necessary to use a hydraulic power to lower same to the ground, but it is necessary to have such power to transfer part of the weight of the truck and its load to such mechanism.

In order to raise the endless track attachment, the drive to the tread of the same is preferably disconnected by opening the clutch 67 and the link 63 operated by the control lever in the cab to move the valve levers 64, 65 and 66 into the reverse position above described and is that shown in Fig. 9, in which case the hydraulic fluid is pumped through the pipes 48, and 53, through the check valve 54, the inlet 45 to the piston rod and to the cylinder; the valve 56 is closed and the valve 55 is opened. This allows the hydraulic fluid to be pressed out of the cylinder 39 through the intake 44 or the pressure relief valve 46 and be returned to the pump or reservoir through the pipe 62. It will be understood that the relief valves 46 and 47 function to transmit hydraulic fluid from either end of the cylinder when it becomes greater than that for which the valves are set.

When the endless track attachment is raised the desired distance above the ground, the pump can be shut off and the hydraulic fluid in the cylinder on the piston rod end be prevented from flowing by the check valve 54 and the proper setting of the relief valve 46 holds same in an elevated position.

From the above description taken in connection with the drawings, it will be obvious that my endless track booster attachment may be utilized with standard trucks already in use or for sale, as well as being adapted to new construction. As the various trucks differ materially in mechanical details, some being chain driven and others driven by propeller shafts or the like, it is obvious that my particular drive mechanism for the endless track treads may be altered to correspond.

Various other changes in general construction or in specific details which may be necessary to adapt my invention to different types of trucks will be within the spirit of same as set forth in the description, drawings and claims.

Having described my invention, what I claim is:

1. An endless track attachment for trucks comprising in combination a truck frame, an axle structure having driving wheels, an endless track attachment having a moving endless track tread, a bell crank, means connecting same to the frame, a link connecting the bell crank and the attachment, radius rod connecting the attachment and the axle, means to operate the bell crank to raise and lower the attachment, and means to drive the attachment from the power mechanism of the tractor.

2. In the art described a truck having a frame, a driving axle having wheels, an endless track attachment having a pair of side plates with an endless track operating between said plates, main journal boxes connected to said plates, radius rods interconnecting the journal boxes and the rear axle, a bell crank mounted in the frame, having a pair of lifting links connected thereto, said links being connected to the journal boxes, means to actuate the bell crank to raise and lower the attachment, a shaft mounted in the journal boxes to drive the endless track, and a telescopic shaft with power means interconnecting the power mechanism of the truck and the said shaft.

3. In the art described the combination of a truck having a frame with a driving axle having wheels, a pair of plates, an endless track operatively supported from said plates, journal boxes on said plates, a drive shaft extending through said boxes, said shaft and boxes being centrally located in reference to the front and rear of said plates, means to drive the endless track from the drive shaft, a main shaft mounted in the frame, a sprocket gear thereon, means to drive the wheels from said sprocket gear, a counter-shaft mounted in the frame, means to operate said countershaft from the main shaft, a telescopic shaft having a gear connection between the countershaft and the drive shaft, means to raise and lower the plates and endless track, and radius rods interconnecting the rear axle and the journal boxes.

4. In the art described, as claimed in claim 3, the means to raise and lower the plates and endless track comprising a bell crank mounted in brackets depending from the frame, links connecting said bell cranks and the journal boxes, and means to actuate said bell cranks.

5. An endless track attachment for trucks comprising in combination a truck frame, a rear axle having driving wheels, an endless track attachment having side plates, a central driving axle and wheel, end idler axles and idler wheels, endless track treads passing over said wheels, means operatively connected between the side plates and the frame to raise and lower the said attachment, a driving connection between the power mechanism of the tractor and the driving axle and driving wheel of the attachment, the means to raise and lower the attachment comprises bell cranks, means pivotally connecting same to the truck frame, links operatively connecting one end of the bell crank to the side plates, links connected to the other end of the bell cranks, a hydraulic cylinder having a piston, and means connecting said piston to the last mentioned links.

6. In the art described, a truck frame having a driving axle with wheels, an endless track attachment positioned forward of the axle and between the tracks of the wheels, a pair of radius rods pivotally connected to opposite sides of said attachment and to the axle, a pair of lifting and depressing devices also connected to opposite sides of said attachment and having an operative connection to the frame for raising and lowering the said attachment.

In testimony whereof I have signed my name to this specification.

CHARLES S. EHRHART.